United States Patent
Muto et al.

(10) Patent No.: US 8,833,885 B2
(45) Date of Patent: Sep. 16, 2014

(54) INK JET RECORDING APPARATUS AND RECORDED ARTICLE

(75) Inventors: Atsushi Muto, Shiojiri (JP); Masanao Sato, Matsumoto (JP); Ryoichi Tanaka, Shiojiri (JP); Satoshi Kimura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/595,788

(22) Filed: Aug. 27, 2012

(65) Prior Publication Data
US 2013/0050336 A1 Feb. 28, 2013

(30) Foreign Application Priority Data

Aug. 26, 2011 (JP) .................. 2011-184473
Aug. 26, 2011 (JP) .................. 2011-184476

(51) Int. Cl.
*B41J 29/38* (2006.01)
*B41J 11/00* (2006.01)
*B41J 19/14* (2006.01)
*B41J 2/21* (2006.01)
B41J 25/308 (2006.01)

(52) U.S. Cl.
CPC ............. *B41J 2/2132* (2013.01); *B41J 19/142* (2013.01)
USPC .................................. 347/9; 8/100

(58) Field of Classification Search
CPC ........................ B41J 2/2132; B41J 2/04526
See application file for complete search history.

(56) References Cited

U.S. PATENT DOCUMENTS

| | | | |
|---|---|---|---|
| 2001/0043242 A1 | 11/2001 | Takahashi | |
| 2006/0082631 A1 | 4/2006 | Adachi | |
| 2006/0268086 A1* | 11/2006 | Kawakami et al. | ........... 347/100 |
| 2009/0098312 A1* | 4/2009 | Goto et al. | ........... 427/595 |
| 2009/0274840 A1* | 11/2009 | Yamakami et al. | ........... 347/100 |

FOREIGN PATENT DOCUMENTS

| | | |
|---|---|---|
| EP | 1 195 249 A2 | 4/2002 |
| JP | 2005-001360 A | 1/2005 |
| JP | 2006-272649 A | 10/2006 |

\* cited by examiner

*Primary Examiner* — Shelby Fidler
(74) *Attorney, Agent, or Firm* — Nutter McClennen & Fish LLP; John J. Penny, Jr.

(57) ABSTRACT

An ink jet recording apparatus records an image on a recording material by ejecting a first ink composition through at least one first liquid ejecting nozzle having an open end. The ink jet recording apparatus also includes a platen having a surface on which the recording medium is placed. The surface is away from the open end at a distance PG satisfying the relationship 0.5 mm<PG<2.5 mm. The first ink composition that has been ejected through the first liquid ejecting nozzle is split into a main droplet having a flying velocity Vm and at least one satellite droplet including a satellite droplet having a flying velocity Vs. The flying velocities Vm and Vs satisfy the relationship Vm−Vs<3 m/s.

18 Claims, 1 Drawing Sheet

INK JET RECORDING APPARATUS AND RECORDED ARTICLE

Priority is claimed under 35 U.S.C. §119 to Japanese Application No. 2011-184473 filed on Aug. 26, 2011 and Japanese Application No. 2011-184476 filed on Aug. 26, 2011, are hereby incorporated by reference in its entirety.

BACKGROUND

1. Technical Field

The present invention relates to an ink jet recording apparatus and a recorded article produced by the ink jet recording apparatus.

2. Related Art

Business printers are required to have various functions and properties according to the use. In particular, printers intended to output drawings created by CAD (computer aided design) systems are required to produce large-sized printed matter at a high speed. The image of the printed matter is required to have a high dimensional precision with reduced drawing errors, and a high repeatability even in tracing very thin lines and writing very small characters.

Ink jet printers are suitable to satisfy these requirements. In order to trace super-fine lines with a higher precision, however, it is desirable that ink droplets be discharged so as not to deviate from a desired direction, and be prevented from splitting into smaller droplets and degrading image quality. To respond to this issue, for example, JP-A-2005-1360 proposes a technique for reducing the occurrence of ink discharge deviation. In this technique, the color material in the ink is inhibited from aggregating around nozzles by reducing the particle size of the color material to 70 nm or less. JP-A-2006-272649 proposes a technique for reducing the occurrence of banding (a phenomenon in which split ink droplets are strung to form a stripe extending in a direction in which the nozzles scan) by modifying the shape of nozzle apertures so as to control the ink flying direction.

In order for ink jet printers to perform more high-definition drawing at a higher speed, it is desirable that ink droplets having a further reduced droplet size be discharged at a higher velocity. In the above-cited techniques, however, ink droplets are split into pieces, and this hinders improvement in image quality. More specifically, in the technique disclosed in JP-A-2005-1360, while discharge deviation can be suppressed, split ink droplets are not inhibited from flying in various directions. The technique disclosed in JP-A-2006-272649 can suppress banding in image drawing. However, when in order to trace still thinner lines, split ink droplets are controlled so as not to be strung, the thin line may be undesirably doubled.

SUMMARY

An advantage of some aspects of the invention is to solve at least part of the above issues, and the following embodiments, or applications, of the invention can be provided.

Application 1

An ink jet recording apparatuses according to an embodiment of the invention includes at least one first liquid injecting nozzle through which a first ink composition is ejected to record an image on a recording medium. The first liquid ejecting nozzle has an open end, and the first ink composition that has been ejected through the first liquid ejecting nozzle is split into a main droplet having a flying velocity $V_m$ and at least one satellite droplet including a satellite droplet having a flying velocity $V_s$. The flying velocities $V_m$ and $V_s$ satisfy the relationship $V_m - V_s < 3$ m/s. The ink jet recording apparatus also includes a platen having a surface on which the recording medium is placed. The surface is away from the open end at a distance PG satisfying the relationship $0.5$ mm $< PG < 2.5$ mm.

In this embodiment, since the distance PG between the open end of the first liquid ejecting nozzle and the surface of the platen satisfies the relationship $0.5$ mm $< PG < 2.5$ mm, the dispersion in the positions of droplets landing on the recording medium can be kept in a predetermined range, even if flying droplets split into main droplets and satellite droplets. In addition, since the difference $V_m - V_s$ in flying velocity between the main droplet and the satellite droplet is less than $3$ m/s ($V_m - V_s < 3$ m/s), the dispersion in the positions of droplets landing on the recording medium can be kept small. Thus, the ink jet recording apparatus can perform more high-definition drawing at a higher speed.

Application 2

In the ink jet recording apparatus, the flying velocity $V_m$ of the main droplet may be more than $7$ m/s ($7$ m/s $< V_m$).

By controlling the flying velocity $V_m$ of the main droplet to more than $7$ m/s, the same effect can be produced as when the distance PG between the open end of the first liquid ejecting nozzle and the surface of the platen is reduced. Specifically, the dispersion in the positions of droplets landing on the recording medium can be further reduced, and high-speed recording can be performed.

Application 3

The first liquid ejecting nozzle may scan at a speed of 33 inches per second or more.

Since the first liquid ejecting nozzle scans at a speed of 33 inches per second or more, the ink jet recording apparatus can perform more high-definition drawing at a higher speed.

Application 4

The first liquid ejecting nozzle may be a piezoelectric ejecting nozzle that ejects liquid with a pressure generated by a piezoelectric element, and a plurality of the first liquid ejecting nozzles are arranged in an ink jet head at intervals of $85$ μm or less in a direction intersecting the direction in which the ink jet heat scans.

Since the piezoelectric liquid ejecting nozzles are arranged at intervals (pitch) of $85$ μm or less in a direction intersecting the direction in which the ink jet head scans, still finer recording can be performed at a high speed.

Application 5

The first ink composition may satisfy at least either (1) containing less than 3% by mass of 1,2-hexanediol or (2) containing 10% by mass or more of glycerol.

Since the first ink composition contains at least either less than 3% by mass of 1,2-hexanediol or 10% by mass or more of glycerol, very small droplets of the first ink composition ejected at a high speed do not easily split into smaller droplets. Also, even if droplets split, the difference in velocity among split droplets can be kept small. Thus, the ink jet recording apparatus can perform more high-definition drawing at a higher speed.

Application 6

The first ink composition may form a lien having a minimum line width of $250$ μm or less.

Since lines having a width as small as $250$ μm or less can be traced for, for example, design drawings, finer images can be recorded.

Application 7

The image may be a design drawing.

The ink jet recording apparatus can record design drawings with a high definition at a high speed.

Application 8

The ink jet recording apparatus may further include a second liquid ejecting nozzle through which a second ink composition concerning a color material and 3% by mass or more of 1,2-hexanediol is ejected.

Since the ink jet recording apparatus can perform recording with such a second ink composition, the image quality of other portions not requiring high definition or high precision can be enhanced, in addition to recording fine, precise drawings. For example, by using a glittering ink containing 3% by mass or more of 1,2-hexanediol, portions that should have glossiness or similar texture can be recorded together with high-definition fine image portions.

Application 9

A recorded article produced by the ink jet recording apparatus is provided.

In the recorded article, a high-definition image, such as a design drawing, is recorded.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the ink jet recording apparatus, ink compositions used in the ink jet recording apparatus, and the recorded article produced by the ink jet recording apparatus will now be described with reference to the drawings and tables. For the sake of easy understanding, the proportions of the dimensions in each figure are varied from the actual proportions.

1. Embodiment 1.1. Ink Jet Recording Apparatus

Figure 1:
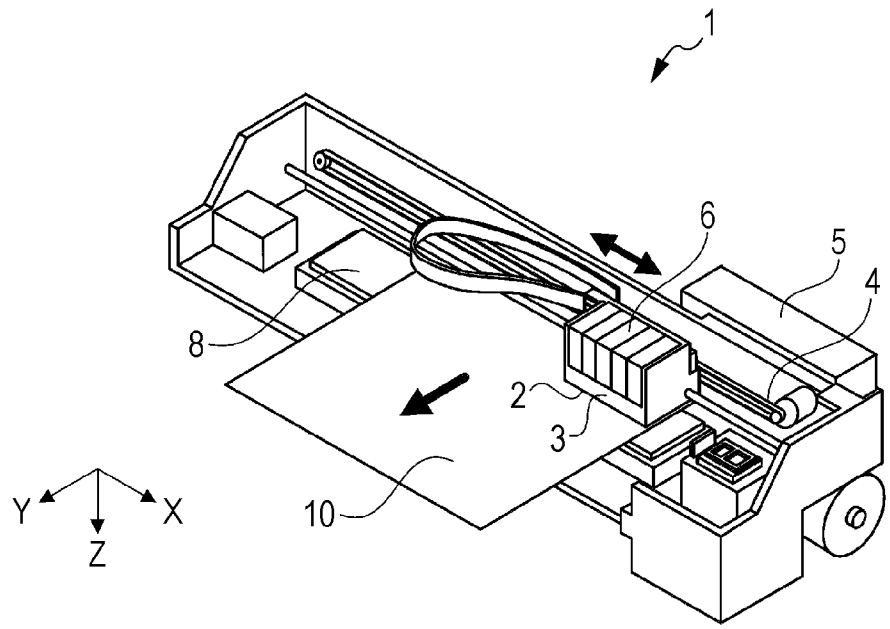
FIG. 1 is a perspective view of an ink jet recording apparatus according to an embodiment.

FIG. 1 is a schematic perspective view of an ink jet recording apparatus 1 according to an embodiment of the invention. The ink jet recording apparatus 1 discharges an ink (ink composition) from an ink jet recording head to deposit the ink on a recording medium, thus recording characters, drawings, images and so forth on the recording medium. The ink jet recording head preferably uses a piezoelectric method. In the piezoelectric method, ink droplets are ejected by applying a pressure according to printing information signals to the ink with a piezoelectric element.

However, the ejection of the ink is not limited to the piezoelectric method, and other methods in which droplets of an ink are ejected to form dots on a recording medium may be applied to the ink jet recording head. For example, recording may be performed by continuously ejecting ink droplets from liquid ejecting nozzles (hereinafter referred to as nozzles) in a strong electric field, for example, between the nozzles and an acceleration electrode disposed in front of the nozzles, and applying a printing information signal from a deflection electrode while the droplets are flying. Recording may be performed by electrostatic suction in such a manner that ink droplets are ejected according to the printing information signal without deflecting the ink droplets. Alternatively, droplets of an ink may be forcibly ejected by pressurizing the ink with a small pump and mechanically vibrating the nozzles with a quartz resonator or the like. Also, a thermal jet method may be applied in which ink droplets are ejected for recording by heating an ink to bubble with a miniature electrode according to the printing information signal.

In FIG. 1, the ink jet recording apparatus 1 is placed on a substantially horizontal X-Y plane. The ink jet recording apparatus 1 is mainly used for outputting CAD drawings and includes ink jet recording heads 2 (hereinafter referred to as head(s) 2), a carriage 3, a carriage driving mechanism 4, a control board 5, an ink cartridge 6, a recording medium feed/ejection mechanism (not shown), and a platen 8. While the carriage 3 on which the heads 2 and the ink cartridge 6 are arranged is reciprocally moved by the carriage driving mechanism 4 across the surface of a recording medium 10 in the X direction shown in FIG. 1, inks are discharged in a substantially vertical direction (Z direction shown in FIG. 1). The control board 5 controls the carriage drive mechanism 4, the discharge of inks, the feed and ejection of the recording medium 10, and so forth. The ink cartridge 6 is divided into a plurality of storage portions respectively containing ink compositions described below. The recording medium feed/ejection mechanism moves the recording medium 10 in a direction intersecting the scanning direction of the carriage 3 (in the Y direction shown in FIG. 1). The platen 8, on which the recording medium 10 is placed, defines the distance between the recording medium 10 and the open end of a nozzle 9 (FIG. 2) that is a first liquid ejecting nozzle of the head 2. The precision in creating drawings (hereinafter referred to as drawing precision) of the ink jet recording apparatus 1 will be described in detail later.

1.2. Recording Medium

Preferably, plain paper is used as the recording medium 10. Plain paper is a type of paper sheets widely used for recording with an ink jet printer, a laser printer, a copy machine or the like, including commercially available paper sheets labeled as "Plain Paper" and paper sheets generally called "plain paper". In general, the plain paper is mainly made of cellulose fiber and substantially does not have a swelling layer of a urethane resin or the like or a porous layer of inorganic particles, such as silica or alumina. Exemplary plain paper include double-sided high-quality plain paper (recycled) (manufactured by Seiko Epson Corp.), Xerox P (manufactured by Fuji Xerox Co., Ltd.), Canon White Plain Paper (manufactured by Canon Inc.), Kassai plain-finished paper (manufactured by Fujifilm Corporation), A4 high-quality plain paper for Brother (manufactured by Brother Industries, Ltd.), and Kokuyo KB paper (multipurpose) (manufactured by Kokuyo Co., Ltd.). However, the recording medium 10 is not limited to plain paper and may be surface-treated paper such as coat paper, art paper or cast-coated paper; a transparent or opaque resin film such as a vinyl chloride sheet or a PET film; or a sheet or film of other materials, such as cloth, wood, plastics or metals.

1.3. Ink Composition

Examples of the ink composition (hereinafter referred to as ink) used in the ink jet recording apparatus 1 of the present embodiment include full color printing inks, such as those of cyan, magenta and yellow, black inks, white inks, and glittering inks. A first ink composition of the inks used in the ink jet recording apparatus 1 contains an appropriate amount of 1,2-hexanediol and glycerol from the viewpoint of increasing the drawing precision. Details concerning drawing precision, including the contents of these solvents, will be described later. General descriptions of the ink used in the ink jet recording apparatus 1 will first be given here.

The ink used in the ink jet recording apparatus 1 according to the present embodiment preferably contains two or more organic solvents. One of the functions of organic solvents is to prevent the ink from being dried and solidified at the ends of the nozzles so as to suppress the occurrence of clogged nozzles and ejection failure. Organic solvents mentioned herein are different from surfactants described later.

(1) Polyhydric Alcohol

The organic solvents of the ink include, for example, polyhydric alcohols. Polyhydric alcohols include ethylene glycol, diethylene glycol, propylene glycol, dipropylene glycol, 1,3-propanediol, 1,4-butanediol, 1,6-hexanediol, and glycerol.

(2) 1,2-Alkanediol

The ink used in the ink jet recording apparatus 1 preferably contains 1,2-alkanediol. 1,2-Alkanediols enhance the wettability to and penetration into recording media of the ink, and thus help form high-quality images on the recording media. Exemplary 1,2-alkanediols include 1,2-propanediol, 1,2-butanediol, 1,2-pentanediol, 1,2-hexanediol, and 1,2-octanediol.

(3) Pyrrolidone Derivatives

The ink used in the ink jet recording apparatus 1 preferably contains a pyrrolidone derivative. The pyrrolidone derivative serves as a suitable dissolving agent of recording media, and thus can enhance the fixability of the ink to recording media. Examples of the pyrrolidone derivative include N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone.

(4) Surfactant

The ink used in the ink jet recording apparatus 1 preferably contains a surfactant. Surfactants suitable for the ink of the present embodiment include known fluorochemical surfactants, acetylene glycol-based surfactants and silicone surfactants. By adding at least one of these surfactants to the ink, the wettability of the ink to recording media can be increased, so that the penetration of ink into the recording media can be enhanced.

Exemplary acetylene glycol-based surfactants include 2,4,7,9-tetramethyl-5-decyne-4,7-diol, 3,6-dimethyl-4-octyne-3,6-diol, 3,5-dimethyl-1-hexyne-3-ol, and 2,4-dimethyl-5-hexyne-3-ol. Commercially available acetylene glycol-based surfactants may be used, such as OLFINEs E1010, STG and Y (each produced by Nissin Chemical Industry); and SURFYNOLs 104, 82, 465, 485 and TG (each produced by Air Products and Chemicals Inc.)

Polysiloxane compounds are preferred silicone surfactants. For example, a polyether-modified organosiloxane may be used. More specifically, silicone surfactants include BYK-306, BYK-307, BYK-333, BYK-341, BYK-345, BYK-346, and BYK-348 (product names, each produced by BYK); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (product names, each produce by Shin-Etsu Chemical Co., Ltd.). The silicone surfactant helps the white ink spread uniformly over the surface of the recording medium without causing ink bleeding or non-uniformity in ink density, and thus can be advantageously used.

Another surfactant may be further added to the ink, such as an anionic surfactant, a nonionic surfactant, or an amphoteric surfactant.

(5) Color Material

The ink used in the ink jet recording apparatus 1 preferably contains at least one color material selected from the group consisting of pigments, dyes, metal oxides, and hollow particles.

(5-1) Pigment

Pigments that can be used as the color material include, but are not limited to, inorganic pigments and organic pigments. Exemplary inorganic pigments include carbon blacks (C.I. Pigment Black 7), such as furnace black, lampblack, acetylene black, and channel black; iron oxide; and titanium oxide.

Exemplary organic pigments include insoluble azo pigments, such as insoluble azo pigments, condensed azo pigments, azo lake, and chelate azo pigments; polycyclic pigments, such as phthalocyanine pigments, perylene and perinone pigments, anthraquinone pigments, quinacridone pigments, dioxane pigments, thioindigo pigments, isoindolinone pigments, and quinophthalone pigments; dye chelates, such as basic dye chelates and acid dye chelates; dye lakes, such as basic dye lakes and acid dye lakes; and nitro pigments, nitroso pigments, aniline black, and daylight fluorescent pigments. The above pigments may be used singly or in combination.

More specifically, inorganic pigments used for black color include: carbon blacks, such as No. 2300, No. 900, MCF88, No. 33, No. 40, No. 45, No. 52, MA7, MA8, MA100, and No. 2200B (each produced by Mitsubishi Chemical); Raven 5750, Raven 5250, Raven 5000, Raven 3500, Raven 1255, and Raven 700 (each produced by Columbia Carbon); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (each produced by Cabot); and Color Black FW1, Color Black FW2, Color Black FW2V, Color Black FW18, Color Black FW200, Color Black 5150, Color Black S160, Color Black 5170, Printex 35, Printex U, Printex V, Printex 140U, Special Black 6, Special Black 5, Special Black 4A, and Special Black 4 (each produced by Degussa).

Organic pigments for yellow color include C.I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, 180, 185, and 213.

Organic pigments for magenta color include C.I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, 245, 254, and 264 and C.I. Pigment Violets 19, 23, 32, 33, 36, 38, 43 and 50.

Organic pigments for cyan color include C.I. Pigment Blues 1, 2, 3, 15, 15:1, 15:2, 15:3, 15:4, 15:6, 15:34, 16, 18, 22, 25, 60, 65, and 66 and C.I. Vat Blues 4 and 60.

Organic pigments for other colors apart from magenta, cyan and yellow include C.I. Pigment Greens 7 and 10, C.I. Pigment Browns 3, 5, 25, and 26, and C.I. Pigment Oranges 2, 5, 7, 13, 14, 15, 16, 24, 34, 36, 38, 40, 43, and 63. In addition, white pigments such as titanium dioxide, hollow particles, and zinc oxide may be used.

A self-dispersing pigment, which is a color material including pigment particles each having a surface to which at least one ionic group is bound directly or with another atomic group therebetween, may be used without particular limitation. For example, the self-dispersing pigment may be a pigment including particles each having a surface to which an ionic group has been bound by diazo coupling, or a pigment including particles each having a surface to which an ionic group has been introduced by surface oxidation using sodium hypochlorite, aqueous ozone, or the like. Pigments may be used singly or in combination. Preferably, the self-dispersing pigment includes particles surface-treated so that the surfaces have one or more functional groups (dispersibility-imparting groups) selected from the groups consisting of —COOH, —CHO, —OH, —SO$_3$H and salts thereof, and can disperse in aqueous ink compositions even if a dispersant is not added. The term "dispersing" of a self-dispersing pigment, mentioned herein refers to a state in which the self-dispersing pigment is present stably in water in the absence of a dispersant, including the state in which the self-dispersing pigment is dissolved in a solvent.

Preferably, the color material of the first ink composition is a self-dispersing pigment. Since self-dispersing pigments can cause the displacement of landing positions more markedly than other color materials, the present embodiment can produce satisfactory effect.

A resin-dispersed pigment is a pigment whose particles are dispersed with a resin dispersant. The resin dispersant may be a block copolymer, a random copolymer or a graft copolymer, of two or more monomers (at least one of which is a hydrophilic monomer) selected from the group consisting of styrene and its derivatives, vinylnaphthalene and its derivatives, aliphatic alcohol esters of α-β-ethylenic unsaturated carboxylic acids, acrylic acid and its derivatives, maleic acid and its derivatives, itaconic acid and its derivatives, fumaric acid and its derivatives, vinyl acetate, vinyl alcohol, vinylpyrrolidone, acrylamide, and derivatives of these compounds, or a salt of these copolymers.

In addition to such a polymeric dispersant, a dispersant or a surfactant may be used in combination. For example, an anionic or nonionic dispersant or surfactant can be suitably used. Examples of the anionic dispersant or surfactant include fatty acid salts, alkylsulfates, alkylbenzene sulfonates, alkylnaphthalene sulfonates, dialkyl sulfosuccinates, alkyl phosphates, naphthalenesulfonic acid-formalin condensate, polyoxyethylene alkylsulfates, and substituted derivatives of these compounds. Examples of the nonionic dispersant or surfactant include polyoxyethylene alkyl ethers, polyoxyethylene alkylphenyl ethers, polyoxyethylene fatty acid esters, sorbitan fatty acid esters, polyoxyethylene sorbitan fatty acid esters, polyoxyethylene alkylamines, glycerin fatty acid esters, oxyethylene-oxypropylene block copolymer, and substituted derivatives of these compounds.

A second ink composition may be used to form a glossy image. The second ink composition contains 3% by mass or more of 1,2-hexanediol, and the color material of the second ink composition is preferably a resin-dispersed pigment.

(5-2) Dye

If a dye is used, it may be selected from various types of dye generally used for ink jet recording, such as direct dyes, acid dyes, food dyes, basic dyes, reactive dyes, disperse dyes, vat dyes, soluble vat dyes, and reactive disperse dyes.

Yellow dyes include C.I. Acid Yellows 1, 3, 11, 17, 19, 23, 25, 29, 36, 38, 40, 42, 44, 49, 59, 61, 70, 72, 75, 76, 78, 79, 98, 99, 110, 111, 127, 131, 135, 142, 162, 164 and 165, C.I. Direct Yellows 1, 8, 11, 12, 24, 26, 27, 33, 39, 44, 50, 58, 85, 86, 87, 88, 89, 98, 110, 132, 142 and 144, C.I. Reactive Yellows 1, 2, 3, 4, 6, 7, 11, 12, 13, 14, 15, 16, 17, 18, 22, 23, 24, 25, 26, 27, 37 and 42, C.I. Food Yellows 3 and 4, and C.I. Solvent Yellows 15, 19, 21, 30 and 109.

Magenta dyes include C.I. Acid Reds 1, 6, 8, 9, 13, 14, 18, 26, 27, 32, 35, 37, 42, 51, 52, 57, 75, 77, 80, 82, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 209, 211, 215, 219, 249, 252, 254, 262, 265, 274, 282, 289, 303, 317, 320, 321 and 322, C.I. Direct Reds 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230 and 231, C.I. Reactive Reds 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63 and 64, C.I. Solubilized Red 1, and C.I. Food Reds 7, 9 and 14.

Cyan dyes include C.I. Acid Blues 1, 7, 9, 15, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 182, 183, 184, 187, 192, 199, 203, 204, 205, 229, 234, 236 and 249, C.I. Direct Blues 1, 2, 6, 15, 22, 25, 41, 71, 76, 77, 78, 80, 86, 87, 90, 98, 106, 108, 120, 123, 158, 160, 163, 165, 168, 192, 193, 194, 195, 196, 199, 200, 201, 202, 203, 207, 225, 226, 236, 237, 246, 248 and 249, C.I. Reactive Blues 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44 and 46, C.I. Solubilized Vat Blues 1, 5 and 41, C.I. Vat Blues 4, 29 and 60, C.I. Food Blues 1 and 2, and C.I. Basic Blues 9, 25, 28, 29 and 44.

Dyes other than magenta, cyan and yellow dyes include C.I. Acid Greens 7, 12, 25, 27, 35, 36, 40, 43, 44, 65 and 79, C.I. Direct Greens 1, 6, 8, 26, 28, 30, 31, 37, 59, 63 and 64, C.I. Reactive Greens 6 and 7, C.I. Acid Violets 15, 43, 66, 78 and 106, C.I. Direct Violets 2, 48, 63 and 90, C.I. Reactive Violets 1, 5, 9 and 10, and C.I. Direct Black 154.

(6) Other Constituents

For adding a pigment into the ink of the present embodiment, a dispersant may be added together to disperse the pigment. The dispersant may be a polymer dispersant conventionally used for preparing a pigment-dispersed liquid. Any of the dispersants used in ordinary inks can be used in the ink of the present embodiment.

Preferably, the ink used in the ink jet recording apparatus 1 of the present embodiment further contain a pH adjuster, a resin such as polyolefin wax, a preservative or fungicide, a rust preventive, and a chelating agent. These materials can improve the characteristics of the ink.

Examples of the pH adjuster include potassium dihydrogenphosphate, sodium dihydrogenphosphate, sodium hydroxide, lithium hydroxide, potassium hydroxide, ammonia, diethanolamine, triethanolamine, triisopropanolamine, potassium carbonate, sodium carbonate, and sodium hydrogencarbonate.

Examples of the resin include polyacrylic acid, polymethacrylic acid, acrylic acid-acrylonitrile copolymer, vinyl acetate-acrylate copolymer, acrylic acid-alkyl acrylate copolymer, styrene-acrylic acid copolymer, styrene-methacrylic acid copolymer, styrene-acrylic acid-alkyl acrylate copolymer, styrene-methacrylic acid-alkyl acrylate copolymer, styrene-α-methylstyrene-acrylic acid copolymer, styrene-α-methylstyrene-acrylic acid-alkyl acrylate copolymer, styrene-maleic acid copolymer, vinylnaphthalene-maleic acid copolymer, vinyl acetate-ethylene copolymer, vinyl acetate-fatty acid vinyl ethylene copolymer, vinyl acetate-maleate copolymer, vinyl acetate-crotonic acid copolymer, and vinyl acetate-acrylic acid copolymer. Waxes as the resin include waxes produced from olefins (ethylene, propylene, butylene, etc.) or their derivatives, and copolymers of such waxes. For example, polyethylene waxes, polypropylene waxes and polybutylene waxes may be used. Polyolefin waxes are commercially available. For example, NOPCOTE PEM 17 (product name, produced by San Nopco), CHEMIPEARL W4005 (product name, produced by Mitsui Chemicals), and AQUACER 515 and AQUACER 593 (product names, produced by BYK) can be used.

Examples of the preservative or fungicide include sodium benzoate, sodium pentachlorophenol, sodium 2-pyridinethiol-1-oxide, sodium sorbate, sodium dehydroacetate, and 1,2-dibenzothiazoline-3-one. Commercially available preservatives or fungicides include Proxel XL2 and Proxel GXL (product names, each produced by Avecia), and Denicide CSA and NS-500W (product names, each produced by Nagase Chemtex).

The rust preventive may be benzotriazole or the like.

Examples of the chelating agent include ethylenediaminetetraacetic acid and its salts, such as disodium dihydrogen ethylenediaminetetraacetate.

2. Performance Specifications

2.1. Drawing Precision

Figure 2:
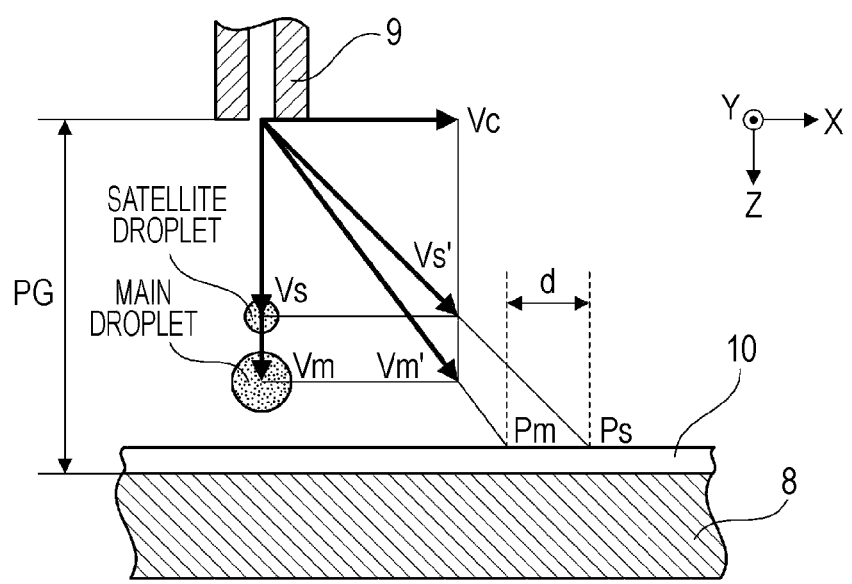
FIG. 2 is a sectional side view that illustrates how discharged ink droplets fly.

The drawing precision in use of the above-described ink jet recording apparatus, ink(s) and recording medium will now be described. FIG. 2 is a sectional side view that illustrates how discharged ink droplets fly. The X, Y and Z directions shown in FIG. 2 correspond to those shown in FIG. 1, respectively. FIG. 2 shows a section taken along an X-Z plane, including a nozzle 9 of the head 2.

In FIG. 2, the surface of the platen 8 extends in the X-Y plane, and on which a recording medium 10 is placed. The open end of the nozzle 9 is located away from the surface of the platen 8 at a distance PG (platen gap PG) in the −Z direction. The nozzle 9 discharges ink droplets in the Z direction while reciprocally scanning in the X directions. FIG. 2 shows a state where the nozzle 9 moves in the X direction at a speed Vc.

The ink droplet discharged from the nozzle 9 often splits into a main droplet and one or more satellite droplets, as shown in FIG. 2. The flying velocity Vm of the main droplet is different from the flying velocity Vs of the satellite droplet, and Vm>Vs holds true. Also, since the nozzle 9 moves in the X direction at a velocity Vc, the velocity vectors of the main droplet and the satellite droplet are Vm' and Vs', respectively. Consequently, the main droplet and the satellite droplet land at positions Pm and Ps, respectively, on the recording medium 10, and the landing positions of the droplets thus have a gap d. The gap d may cause the traces of the ink to be thick or double.

For highly precise drawing, however, it is required that lines having desired thicknesses be drawn at desired positions. Accordingly, it is desirable that the gap d be minimized. More specifically, it is desirable that discharged ink droplets be prevented from being split into a main droplet and a satellite droplet, or that the difference between the flying velocities Vm and Vs be reduced even if the droplets split. In addition, by increasing the flying velocities Vm and Vs of the split droplets so as to be much higher than the scanning speed Vc of the nozzle 9, the gap d can be minimized.

2.2. Properties of Ink Jet Recording Apparatus 1

The ink jet recording apparatus 1 capable of producing high-definition printed articles at a high speed has the following properties.

(1) Carriage Speed

The carriage 3 scans at a speed of 33 inches per second (in/s) or more with the carriage drive mechanism 4. Hence, the ink jet recording apparatus 1 has a recording speed of 330 characters per second (cps) or more, and more preferably 360 cps or more. Since the nozzle 9 scans at a speed of 33 in/s or more, high-speed recording (drawing) can be performed. The drawing speed of the ink jet recording apparatus 1 is higher than that of known recording apparatuses used for printing posters, photographs or the like.

(2) Relationship Between Vm and Vs

When the injected first ink composition is split into a main droplet having a flying velocity Vm and satellite droplets including a satellite droplets having a flying velocity Vs, it is preferable that the relationship Vm−Vs<3 m/s be hold true. The relationship is more preferably Vm−Vs<2.6 m/s, still more preferably Vm−Vs<2.3 m/s, and further preferably Vm−Vs<2.2 m/s. When such a relationship is satisfied, the dispersion in the positions of droplets landing on the recording medium 10 can be reduced. Thus, the ink jet recording apparatus 1 can perform more high-definition drawing at a higher speed. The ink jet recording apparatus 1 of the present embodiment can exhibit Vm−Vs<2 m/s when used in combination with the first ink composition that will be described later.

In addition, the flying velocity Vm of the main droplet is preferably higher than 7 m/s (7 m/s<Vm). More preferably, the flying velocity Vm is higher than 7.5 m/s (7.5 m/s<Vm), and still more preferably higher than 8 m/s (8 m/s<Vm). By controlling the flying velocity Vm of the main droplet to such a value, the same effect can be produced as when the distance PG between the open end of the nozzle 9 and the surface of the platen 8 on which the recording medium 10 is placed is reduced. Hence, the dispersion in the positions of droplets landing on the recording medium 10 can be further reduced, and high-speed recording can be performed. The ink jet recording apparatus 1 of the present embodiment can exhibit 8 m/s<Vm when used in combination with the first ink composition that will be described later.

(3) Platen Gap

Preferably, the distance (platen gap) PG between the open end of the nozzle 9 and the surface of the platen 8 on which the recording medium 10 is placed satisfies the relationship 0.5 mm<PG<2.5 mm. More preferably, 1.1 mm<PG<2 mm holds true. By controlling the platen gap PG in such a range, the dispersion in the positions of droplets landing on the recording medium 10 can be kept in a predetermined range even if flying droplets split into main droplets and satellite droplets. Thus, the ink jet recording apparatus 1 can perform more high-definition drawing at a higher speed. In Examples 1 to 8 (described below), the platen gap PG of the ink jet recording apparatus 1 was about 1.6 mm.

(4) Nozzle Resolution

Preferably, the nozzles 9 are arranged at a pitch of 85 μm or less in a direction (sub scanning direction) intersecting the direction in which the ink jet head scans. Such an arrangement with a pitch of 85 μm or less results in a nozzle density of about 300 dpi or more, and, thus, finer recording can be performed at a high speed. In known ink jet recording apparatuses, the recording precision in the direction in which the recording medium is moved (Y direction, sub scanning direction) tends to be inferior to the recording precision in the main scanning direction. Accordingly, when a detailed drawing has been created with thin lines, a portion inferior in landing position precision may be clear in the drawing. Thus, by closely arranging the nozzles at a very high density, the recording apparatus can perform more high-definition recording even when drawing thinner lines. The ink jet recording apparatus 1 of the present embodiment have nozzles 9 preferably having a diameter of 15 to 25 μm, more preferably 21 to 23 μm.

(5) Other Properties

Preferably, the ink jet recording apparatus can draw lines with a minimum line width of 250 μm or less. The ink jet recording apparatus used in combination with the above-described ink composition according to the present embodiment is effective in drawing such thin lines. Preferably, the ink jet recording apparatus 1 includes an ink jet head that discharges droplets each having a weight of 26 ng or less on average (for example, a weight obtained by averaging the weights of droplets discharged from the beginning of recording of an image to the end of the recording). More preferably, the average weight of a droplet discharged from the ink jet head is 1 to 26 ng, still more preferably 3 to 26 ng, and most preferably 3 to 21 ng. Thus, the ink jet recording apparatus 1 can create drawings with a minimum line width of 250 μm in combination with the first ink composition that will be described later. Since lines having a width as small as 250 μm can be traced in design drawing, finer images can be recorded. The invention can be advantageously applied to ink jet recording apparatuses used for design drawing. A recording apparatus for design drawing refers to a recording apparatus that is intended to create design drawings with, for example, a CAD system, and that is stated to be effective in creating design drawings with, for example, a CAD system.

2.3. Ink Composition (1) 1,2-Hexanediol

The first ink composition used for the ink jet recording apparatus 1 preferably contains 1,2-hexanediol. The 1,2-hexanediol content in the first ink composition is preferably 3% by mass or less, and more preferably in the range of 0.5% to 2% by mass. Still more preferably, the 1,3-hexanediol content is 0.5% to 1.7% by mass, and is further preferably 0.5% to 1.5% by mass.

A flying droplet after being discharged from the nozzle is changed in shape by the surface tension such that its surface area is minimized. At this time, the droplet may split into smaller droplets. In general, 1,2-hexanediol is used as a penetrant or a solubilizing agent for water-insoluble solvent. By controlling the 1,2-hexanediol content in the above range, the gap d between landing positions of split droplets can be reduced. One reason of this probably is that 1,2-hexanediol reduces the effect of surface tension on the droplet splitting into smaller droplets. More specifically, it is believed that the hydroxy group of 1,2-hexanediol has an affinity that can reduce the dynamic surface tension of tiny droplets discharged at a high frequency (for example, 10 kHz or more). Consequently, flying droplets do not easily split into smaller droplets, and accordingly, the gap d between landing positions can be reduced. However, an excessive amount of 1,2-hexanediol results in an increased gap between landing positions.

(2) Glycerol

The first ink composition advantageously contains glycerol. The glycerol content in the first ink composition is preferably 10% by mass or more, more preferably 12% by mass or more, and still more preferably 14% by mass or more. Glycerol in an ink composition can prevent clogging with the ink composition. In addition, by controlling the glycerol content in the above range, flying droplets do not easily split into smaller droplets. Also, even if droplets split, the difference in velocity among split droplets can be kept small. Thus, the dispersion in the positions of droplets landing on the recording medium 10 can be reduced.

(3) Second Ink Composition

The ink jet recording apparatus 1 may use a second ink composition ejected through a second nozzle, as well as using the first ink composition for high definition drawing. The second ink composition contains 3% by mass or more of 1,2-hexanediol. The second ink composition is used for portions not requiring high definition or high precision so as to enhance the image quality of such portions, so that the first ink composition can be used only for design drawings so as to record fine drawings. The pigment of the second ink composition may be a resin-dispersed pigment or a glittering pigment (silver, aluminum, pearl, etc.) Such a second ink composition can be used for recording image portions that should have glossiness or similar texture (specifically for glittering images).

By using the ink jet recording apparatus and ink compositions according to the present embodiment, a recorded article having a more high-definition image (particularly, design drawing) can be produced at a higher speed.

3. Examples

Examples will be described below. A test apparatus modified from PX-H10000 (manufacture by Seiko Epson Corp.) was used as the ink jet recording apparatus 1. The platen gap PG was set at about 1.6 mm, and the carriage speed was set at about 33 in/s. The nozzles of the head had a diameter of about 20%. The first composition contained glycerol, 1,2-hexanediol, trimethylolpropane, propylene glycol, Surfynol 104PG50 (surfactant, produced by Nissin Chemical Industry), and pure water. PX mat paper roll (thin) (manufactured by Seiko Epson Corp.) was used as the recording medium 10. However, the present invention is not limited to these conditions.

Inks used in the Examples and Comparative Example contained 6.5% by mass of carbon black as a pigment. The carbon black was prepared as below. With 1 kg of water was mixed 100 g of a commercially available carbon black, Color Black S170 (produced by Degussa-Huls). The mixture was pulverized with zirconia beads in a ball mill. To the resulting liquid was dropped 1400 g of sodium hypochlorite (effective chlorine concentration: 12%). The mixture was subjected to reaction for 5 hours while being pulverized in a ball mill, and was then boiled with stirring for 4 hours for wet oxidation. The resulting dispersion liquid was filtered through a glass fiber filter GA-100 (product name, available from Advantech Toyo), followed by washing with water. The resulting wet cake was dispersed in 5 kg of water and purified by deionization through a reverse osmosis membrane until the electric conductivity was reduced to 2 mS/cm. Further, the dispersion was concentrated to a pigment content of 20% by weight.

3.1. Examples 1 to 8

Evaluation results of Examples 1 to 8 are shown in Table 1. Ink compositions of Examples 1 to 8 were prepared according to the compositions shown in Table 1 in which the contents of 1,2-hexanediol and glycerol were varied.

TABLE 1

|  |  | Example | | | | | | | |
|---|---|---|---|---|---|---|---|---|---|
|  |  | 1 | 2 | 3 | 4 | 5 | 6 | 7 | 8 |
| Ink (wt %) | 1,2-Hexanediol | 2 | 1.5 | 1.5 | 1 | 1.5 | 1 | 0.5 | 1 |
|  | Glycerol | 10 | 13 | 14 | 14 | 15 | 15 | 15 | 16 |
|  | Trimethylolpropane | 3 | 3 | 3 | 3 | 3 | 3 | 3 | 3 |
|  | Propylene glycol | 3 | 3 | 3 | 3 | 3 | 3 | 3 | 3 |
|  | Surfynol 104PG50 | 0.2 | 0.2 | 0.2 | 0.2 | 0.2 | 0.2 | 0.2 | 0.2 |
|  | Pure water | Balance | Balance | Balance | Balance | Balance | Balance | Balance | Balance |
|  | Total | 100 | 100 | 100 | 100 | 100 | 100 | 100 | 100 |
| Results | Vm (m/s) | 8.26 | 8.84 | 8.14 | 8.20 | 8.17 | 8.10 | 8.03 | 8.00 |
|  | Vs (m/s) | 5.92 | 6.32 | 5.96 | 6.23 | 6.07 | 6.00 | 6.14 | 6.21 |
|  | Vm − Vs (m/s) | 2.34 | 2.52 | 2.18 | 1.97 | 2.10 | 2.10 | 1.89 | 1.79 |
|  | Landing position gap d (μm) | 64.2 | 60.5 | 60.2 | 51.7 | 56.8 | 57.9 | 51.4 | 48.3 |
|  | Evaluation | Fair | Good | Good | Excellent | Excellent | Good | Excellent | Excellent |

The results were evaluated in the gap d between landing positions according to the following criteria.

Excellent: d<57 μm
Good: 57 μm≤d<61 μm
Fair: 61 μm≤d<65 μm
Bad: 65 μm≤d

Table 1 shows that the velocity Vs of satellite droplets was varied when the contents of 1,2-hexanediol and glycerol were varied. Accordingly, the difference Vm−Vs in velocity between the main droplet and the satellite droplet can be reduced, and good or excellent results were obtained when the 1,2-hexanediol content was 1.5% by mass or more and the glycerol content was 13% by mass or more.

3.2. Examples 9 to 11 Comparative Example

Table 2 shows estimates of landing position gap d when the platen gap PG was varied in Example 8. In the Comparative Example, the head came into contact with the recording medium, and consequently, the landing position gap could not be evaluated. As the platen gap PG is reduced, or as the distance between the open end of the nozzle 9 and the surface of the platen 8 is reduced, the landing position gap d decreases. However, it is necessary to allow for the thickness and bending of the recording medium 10. Such a platen gap PG as in the Comparative Example is likely to cause the nozzle 9 to come into contact with the recording medium 10.

TABLE 2

|  |  | Example | | | | Comparative Example |
|---|---|---|---|---|---|---|
|  |  | 9 | 10 | 8 | 11 | 1 |
| Ink (wt %) | 1,2-Hexanediol | 1 | 1 | 1 | 1 | 1 |
|  | Glycerol | 16 | 16 | 16 | 16 | 16 |
|  | Trimethylolpropane | 3 | 3 | 3 | 3 | 3 |
|  | Propylene glycol | 3 | 3 | 3 | 3 | 3 |
|  | Surfynol 104PG50 | 0.2 | 0.2 | 0.2 | 0.2 | 0.2 |
|  | Pure water | Balance | Balance | Balance | Balance | Balance |
|  | Total | 100 | 100 | 100 | 100 | 100 |
| Results | PG (mm) | 0.8 | 1.2 | 1.6 | 2.1 | 0.5 |
|  | Vm (m/s) | 8.00 | 8.00 | 8.00 | 8.00 | 8.00 |
|  | Vs (m/s) | 6.21 | 6.21 | 6.21 | 6.21 | 6.21 |
|  | Vm − Vs (m/s) | 1.79 | 1.79 | 1.79 | 1.79 | 1.79 |
|  | Landing position gap d (μm) | 24.2 | 36.2 | 48.3 | 63.4 | — |
|  | Evaluation | Excellent | Excellent | Excellent | Fair | Bad |

What is claimed is:

1. An ink jet recording apparatus comprising:
an ink container containing a first ink composition and including at least one first liquid ejecting nozzle through the a first ink composition is ejected to record an image on a recording medium, the at least one first liquid ejecting nozzle having an open end, the first ink composition having been ejected being split into a main droplet having a flying velocity Vm and at least one satellite droplet including a satellite droplet having a flying velocity Vs, the flying velocities satisfying the relationship Vm−Vs<2 m/s;
a controller that controls to cause the ejection of the first ink composition from the at least one first liquid ejecting nozzle; and
a platen having a surface on which the recording medium is placed, the surface being away from the open end at a distance PG satisfying the relationship 0.5 mm<PG<2.5 mm,
wherein the first ink composition satisfies at least either:
(1) containing less than 3% by mass of 1,2-hexanediol; or
(2) containing 10% by mass or more of glycerol.

2. The ink jet recording apparatus according to claim 1, wherein the flying velocity Vm of the main droplet satisfies the relationship 7 m/s<Vm.

3. The ink jet recording apparatus according to claim 1, wherein the at least one first liquid ejecting nozzle scans at a speed of 33 inches per second or more.

4. The ink jet recording apparatus according to claim 1, wherein the at least one first liquid ejecting nozzle is a piezoelectric ejecting nozzle that ejects liquid with a pressure generated by a piezoelectric element, and the at least one first liquid ejecting nozzle includes a plurality of first liquid ejecting nozzles arranged in an ink jet head at intervals of 85 μm or less in a direction intersecting the direction in which the ink jet head scans.

5. The ink jet recording apparatus according to claim 1, wherein the first ink composition satisfies (1) and (2).

6. The ink jet recording apparatus according to claim 1, wherein the ink jet recording apparatus is adapted to form a line having a minimum width of 250 μm.

7. The ink jet recording apparatus according to claim 1, wherein the ink jet recording apparatus is adapted to record a design drawing as the image.

8. The ink jet recording apparatus according to claim 1, further comprising
a second ink container containing a second ink composition and including a second liquid ejecting nozzle through which the second ink composition is ejected, the second ink composition containing a color material and 3% by mass or more of 1,2-hexanediol.

9. The ink jet recording apparatus according to claim 1, further comprising an ink jet head in which the at least one first liquid ejecting nozzle is arranged, wherein:

the ink jet head moves the at least one first liquid ejecting nozzle in a first direction, and the distance PG is along a second direction that is perpendicular to the first direction and that is perpendicular a third direction in which the recording medium moves relative to the platen, the second direction being perpendicular to the third direction.

10. The ink jet recording apparatus according to claim 1, wherein the flying velocities satisfy the relationship $Vm-Vs<1.7$ m/s.

11. A recorded article produced by the ink jet recording apparatus as set forth in claim 1.

12. A recorded article produced by the ink jet recording apparatus as set forth in claim 2.

13. A recorded article produced by the ink jet recording apparatus as set forth in claim 3.

14. A recorded article produced by the ink jet recording apparatus as set forth in claim 4.

15. A recorded article produced by the ink jet recording apparatus as set forth in claim 5.

16. A recorded article produced by the ink jet recording apparatus as set forth in claim 6.

17. A recorded article produced by the ink jet recording apparatus as set forth in claim 7.

18. A recorded article produced by the ink jet recording apparatus as set forth in claim 8.

* * * * *